No. 697,509. Patented Apr. 15, 1902.
J. F. MARTIN.
MOLD FOR POSTS OR POLES.
(Application filed Feb. 14, 1902.)
(No Model.) 2 Sheets—Sheet 1.
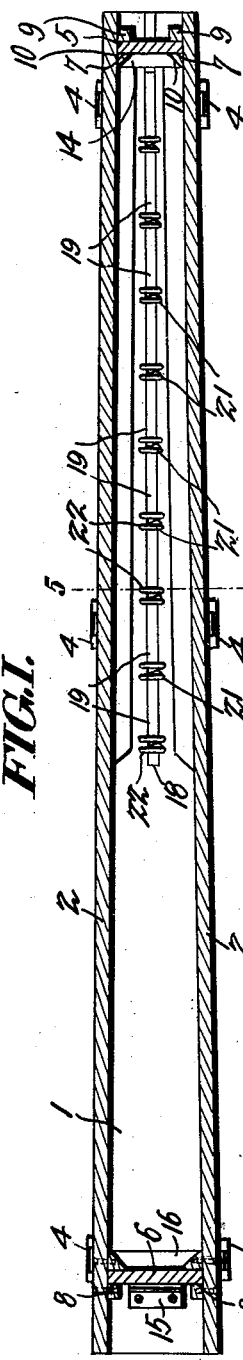
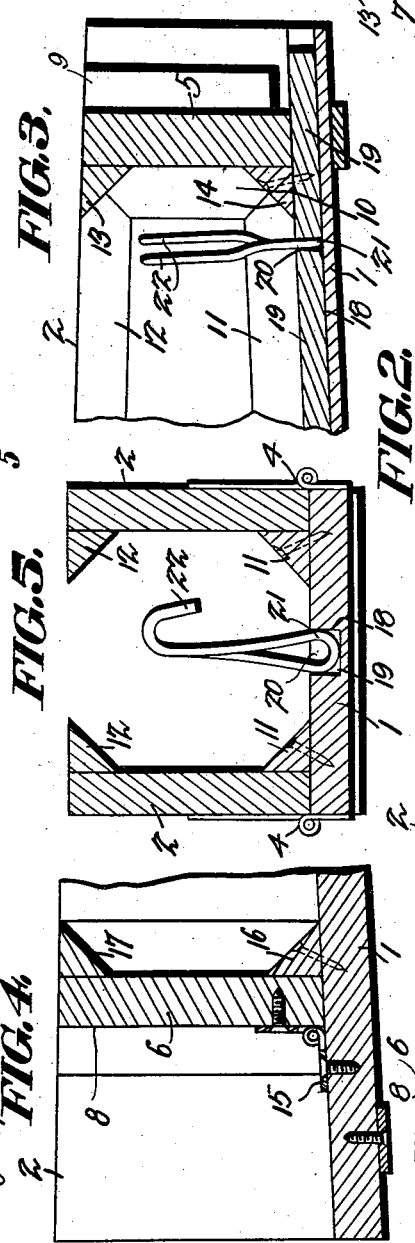
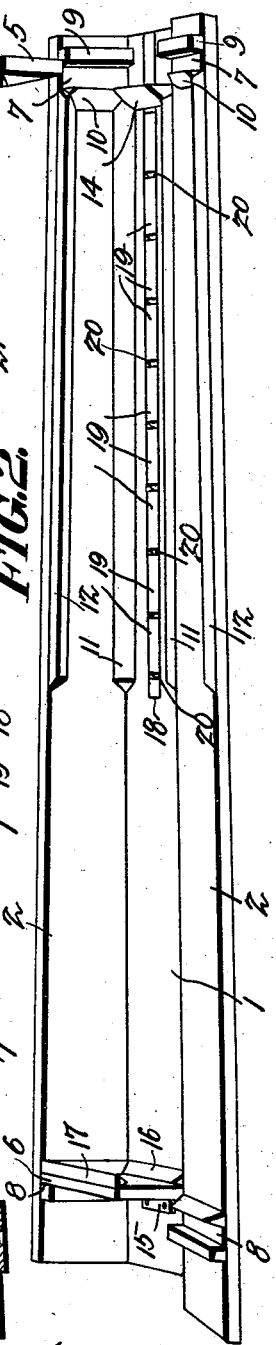
Witnesses J. F. Martin, Inventor.
by C. A. Snow & Co.
Attorneys No. 697,509. Patented Apr. 15, 1902.
J. F. MARTIN.
MOLD FOR POSTS OR POLES.
(Application filed Feb. 14, 1902.)
(No Model.) 2 Sheets—Sheet 2.
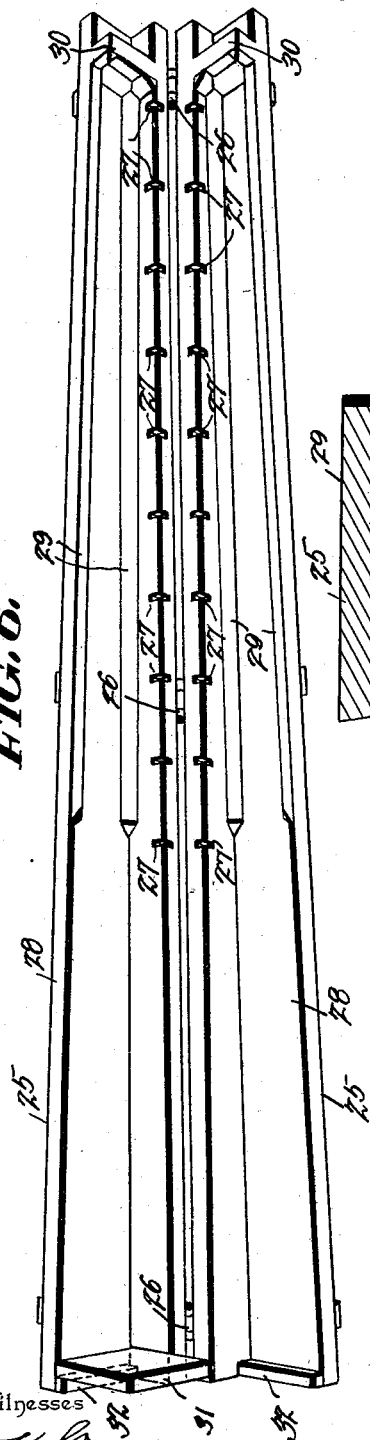
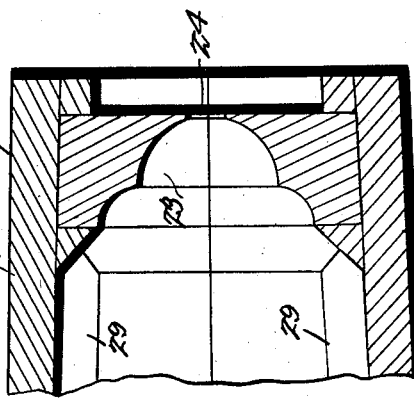
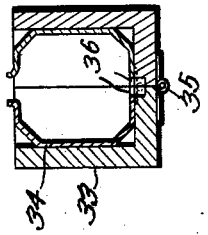
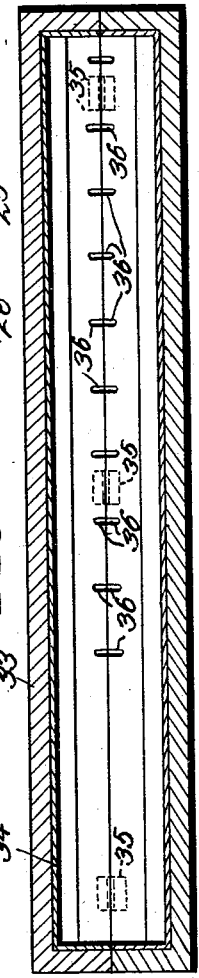
J. F. Martin, Inventor.

UNITED STATES PATENT OFFICE.

JOHN F. MARTIN, OF MARSHALL, MICHIGAN.

MOLD FOR POSTS OR POLES.

SPECIFICATION forming part of Letters Patent No. 697,509, dated April 15, 1902.

Application filed February 14, 1902. Serial No. 94,131. (No model.)

*To all whom it may concern:*

Be it known that I, JOHN F. MARTIN, a citizen of the United States, residing at Marshall, in the county of Calhoun and State of Michigan, have invented a new and useful Mold for Posts or Poles, of which the following is a specification.

The invention relates to improvements in molds for posts and poles.

The object of the present invention is to improve the construction of molds and to provide a simple, inexpensive, and efficient one, designed more especially for molding fence-posts, poles, and the like, and capable of enabling such a post or pole to be readily removed from the mold after the material of which the same is constructed has hardened.

A further object of the invention is to provide a mold of this character which will be adapted to support a series of devices for forming eyes or loops on a fence-post for the attachment of the fencing material and which will also enable the ring of a hitching-post or a similar device to be readily supported in position.

The invention consists in the construction and novel combination and arrangement of parts hereinafter fully described, illustrated in the accompanying drawings, and pointed out in the claims hereto appended.

In the drawings, Figure 1 is a longitudinal sectional view of a mold constructed in accordance with this invention. Fig. 2 is a perspective view of the same, the mold being partly open. Fig. 3 is an enlarged detail sectional view of one end of the mold. Fig. 4 is a similar view of the other end of the mold. Fig. 5 is a transverse sectional view on the line 5 5 of Fig. 1. Fig. 6 is a perspective view of another form of mold. Fig. 7 is a longitudinal sectional view of a modification of the invention. Fig. 8 is a transverse sectional view of the same. Fig. 9 is an enlarged sectional view of one end of the mold, showing a sectional end block for receiving the shank or rod of an eye or ring of a hitching-post.

Like numerals of reference designate corresponding parts in all the figures of the drawings.

1 designates the bottom of a fence-post mold, which is provided with movable sides 2, preferably connected with the bottom at the side edges thereof by hinges 4 and adapted to be swung outward to open the mold, as illustrated in Fig. 2 of the accompanying drawings. The sides of the mold rest upon the bottom 1, as illustrated in Fig. 5 of the drawings, when the mold is closed, and instead of employing the hinges 4 the sides may be detachably or removably mounted on the bottom by means of mortise-and-tenon joints. The mold is also provided with end pieces 5 and 6, which are movable, being supported rigidly in an upright position when the mold is closed by grooves 7 and 8 of the sides of the mold. The upper end piece 5 or the end piece which is arranged at the top of the post or pole is detachable, and the grooves 7 are formed by transverse blocks or pieces 9 and 10, spaced apart to receive the end piece 5. The inner blocks 10 have beveled inner faces to form beveled corners for the upper portion or top of the post; but the inner blocks may be of any configuration to provide the desired ornamentation of the post. Similar beveled edges are formed at the longitudinal corners or edges of the upper portion of the post by means of longitudinal strips 11 and 12, secured, respectively, to the bottom and sides of the mold. The strips 11 of the bottom are arranged at opposite sides of the central portion of the same and are spaced from the side edges of the bottom to provide spaces to receive the lower edges of the sides when the mold is closed, as shown in Fig. 5. The longitudinal strips 12 of the sides are arranged at the upper edges of the same when the said sides are closed or in a vertical position. The longitudinal strips, which may be of any desired length, terminate near the center of the mold, and the lower portion of the post is plain and is designed to be embedded in the ground. The sides and bottom are tapering to form a tapering post, which may be constructed of any plastic material, such as artificial stone or the like.

The end piece 5 is provided at its upper edge with a transverse block or piece 13, which is located above and opposite a transverse piece 14, which is mounted on the bottom 1, and the said blocks or pieces 13 and 14 are arranged between the hinged sides when the mold is closed. The other end piece 6 is connected with the bottom by a hinge 15 and is adapted to swing downward and outward when the mold is open. When the end piece 6 is in a vertical position, it abuts against a transverse block or piece 16, which is arranged beneath a similar block or piece 17, mounted upon the end 6. These transverse blocks or pieces 16 and 17 have their inner faces beveled, and the sides 2 are provided with the said grooves 8, which are formed by blocks or pieces similar to the grooves 7, the inner blocks or pieces being beveled.

The bottom is provided with a longitudinal groove 18, extending from the smaller end of the mold to about the center of the same and receiving a series of blocks or pieces 19, which are spaced apart to form recesses or sockets 20 for the reception of loops or eyes 21, designed to project from the finished post for the attachment of fence-wires or other fencing material. The blocks or pieces 19 may be of any desired length to arrange the sockets or recesses at the desired intervals, and the loops or eyes, which are preferably constructed of stout wire, are formed by doubling a piece of wire and bending the end portions thereof to provide approximately hook-shaped shanks 22, as clearly illustrated in Fig. 5 of the drawings. These hook-shaped shanks are preferably spaced apart, as shown in Fig. 3, and they are embedded in the fence-post.

When the post is designed for use as a hitching-post, a sectional top piece 23, having an opening 24, may be employed to permit the shank or rod of an eye or loop to be embedded in the top of the post, and after the post has been completed the block or end piece may be separated to enable it to be disengaged from the loop or ring of the top piece.

Instead of hinging the sides to the bottom they may be fixed to the same, and the latter may be composed of two sections 25, connected by hinges 26 and provided with opposite recesses or sockets 27, forming sockets for the reception of loops or eyes similar to those illustrated in Figs. 3 and 5 of the drawings. The sides 28, which are fixed to the sections of the bottom, are provided with beveled strips 29, and they have sections 30 of an end piece, which may be fixed to the sides and to the sections of the bottom. The end piece 31 is removable and is supported by transverse strips 32 of the sides; but instead of constructing the end pieces in this manner they may be made as heretofore described.

In Figs. 7 and 8 is illustrated a mold 33, having a metallic lining 34 and hinged at the bottom at 35. The metallic lining is composed of two sections, as clearly shown in Fig. 8, and it is provided with openings or sockets 36, which register with recesses or sockets of the bottom of the body portion of the mold for the reception of the eyes or loops for the attachment of the fencing material. Instead of hinging the mold at the center of the bottom, as shown in Figs. 7 and 8, the sides may be hinged, as illustrated in Figs. 1 to 5, inclusive. The sections of the metallic lining are shaped to form the beveled edges, and they are provided at the top of the mold with longitudinal flanges extending upward and adapted to prevent the plastic material from overflowing and facilitating the formation of a smooth upper face by a trowel or other tool. If desired, the metallic lining, which is detachably arranged within the body portion of the mold, may be used independently and is adapted to form of itself an efficient post-mold.

It will be seen that the mold is exceedingly simple and inexpensive in construction, that it is adapted to enable fence-posts, poles, and the like to be effectively and rapidly molded, and that the mold is adapted to receive a frame for binding the material to prevent the same from cracking or breaking.

What I claim is—

1. A mold comprising a bottom provided at intervals with sides or openings arranged to receive eyes or loops and adapted to support the same, whereby the latter are partially embedded in a post, sides connected with the bottom, and end pieces, substantially as described.

2. A mold comprising a bottom, transverse strips, sides connected with the bottom and supporting the transverse strips, and an end piece supported by the transverse strips, substantially as described.

3. A mold comprising a bottom, sides, strips secured to the sides and arranged in pairs to form grooves, and end pieces supported by the grooves, substantially as described.

4. A mold comprising a bottom, sides having grooves, and an end piece hinged to the bottom and detachably interlocked with the grooves, substantially as described.

5. A mold comprising a bottom, longitudinal strips secured to the bottom at opposite sides of the center thereof and spaced from the side edges, sides hinged to the bottom and arranged upon the side portions of the bottom beyond the strips thereof and provided at their upper edges with longitudinal strips, transverse strips mounted on the sides and forming grooves, an end piece detachably interlocked with the grooves, and upper and lower transverse strips or pieces arranged at the top and bottom of the end piece, substantially as described.

6. A mold provided in one of its walls with a longitudinal groove and having a series of short strips or pieces arranged within the mold and spaced apart to form recesses or openings adapted to receive eyes or loops of a fence-post or pole, substantially as described.

7. A mold comprising a bottom, sides hinged to the bottom, an end piece also hinged to the bottom, and strips secured to the sides and bottom and supporting the end piece, substantially as described.

In testimony that I claim the foregoing as my own I have hereto affixed my signature in the presence of two witnesses.

JOHN F. MARTIN.

Witnesses:
OWEN L. TOWNSEND,
INEZ L. MILLER.